United States Patent [19]

Lefteriou et al.

[11] Patent Number: 4,829,819
[45] Date of Patent: May 16, 1989

[54] IN-LINE DUAL ELEMENT FLUID FLOW PROBE

[75] Inventors: Nicholas Lefteriou, Waltham; Steve Rieven, Southboro; Charle Cohen, Sharon, all of Mass.

[73] Assignee: Environmental Instruments, Inc., Natick, Mass.

[21] Appl. No.: 76,005

[22] Filed: Jul. 21, 1987

[51] Int. Cl.[4] ................................................. G01F 1/68
[52] U.S. Cl. .................................. 73/204.21; 73/204.26
[58] Field of Search .................... 73/189, 204, 204.21, 73/204.26

[56] References Cited

U.S. PATENT DOCUMENTS

| 3,435,676 | 4/1969 | Bruckner et al. | 73/189 |
| 3,677,085 | 7/1972 | Hayakawa | 73/204 |
| 4,691,566 | 9/1987 | Aine | 73/204 |

FOREIGN PATENT DOCUMENTS 0885892  11/1981  U.S.S.R. ................................. 73/204

OTHER PUBLICATIONS

Mahler, "Bidirectional Hot-wire Anemometer", in Rev. Sci. Inst. 53(9), 9/82, pp. 1465, 1466.

Primary Examiner—Herbert Goldstein
Attorney, Agent, or Firm—Lorusso & Loud

[57] ABSTRACT

A hot film dual element fluid flow sensing device has its two hot-film sensors arranged in-line on an elongate support. A flow deflection collar is situated midway on the support between the two flow sensors and deflects the flow away from the sensor situated behind the collar. Underlying the sensor films of the two flow sensors and electrically insulated from those sensor films is an electrical heater. In operation of the device, the heater and the sensor films are electrically heated to about the same temperature to inhibit heat transfer therebetween. Because of that arrangement, the device responds rapidly to changes in fluid flow because virtually all the heat lost by the sensor films is transferred directly into the surrounding fluid.

4 Claims, 1 Drawing Sheet

IN-LINE DUAL ELEMENT FLUID FLOW PROBE

FIELD OF THE INVENTION

This invention relates in general to the measurement of flow rate and/or direction of flow of a flowing fluid by ascertainment of the amount of heat transferred to the fluid from a heated probe immersed in the fluid. In the context of this exposition, the fluid may be in the form of a gas, a vapor, or a liquid. More particularly, the invention pertains to the construction of a hot film probe characterized by extremely fast response to changes in flow rate and/or flow direction. The hot film probe of the invention is particularly suitable for use with fluids carrying impurities such as abrasive solid particles and for the measurement of very high rates of flow.

BACKGROUND OF THE INVENTION

Hot wire probes for measuring the rate of fluid flow have been known at least since the early 1900's. The hot film probes which were developed in the mid-1950's were an improvement upon the earlier hot wire devices. Those hot film probes had better dynamic response, superior mechanical properties, and higher signal-to-noise ratios than the hot wire probes. For a discussion of the early hot film probe, see the monograph titled "The Hot-Film Anemometer: A New Device For Fuuid Mechanics Research" by S. C. Ling and P. G. Hubbard in the Journal Of The Aeronautical Sciences, September 1956, pp 890 and 891.

The hot film probe was improved in subsequent years and some of those improved devices are described in U.S. Pat. Nos. 3,352,154; 3,900,819; and 4,024,761. From those patents and from other technical literature dealing with hot film probes, it is evident that efforts were made to improve the response of the probe to changes in the fluid's rate of flow by improving the sensitivity of the probe—that is, by improving the ability of the probe to respond to small changes in the flow rate. Despite the improvement efforts, the response time of the hot film probe to changes in flow rate, without degrading the accuracy of measurement, has remained relatively slow. In recent times, a need has arisen for hot film probes that accurately respond to flow rate changes with a rapidity unavailable from presently known hot film probes.

U.S. Pat. No. 4,024,761, in FIGS. 7 and 8, shows a thin film probe having three parallel heated elements arranged side by side and held together by thermally insulative bridges closing the gaps between adjacent elements. That three element probe is an improvement upon the dual element probe shown in FIGS. 12 and 13 of U.S. Pat. No. 3,900,819 because the three element probe provided increased sensitivity compared to the dual element sensor. That increase in sensitivity was attributed to the heat provided by the middle element to the leeward sensor element. It is recognized in U.S. Pat. No. 4,024,761 that the spacial response of the dual element sensor can be selectively altered by disposing a third heated element between the two sensors. Specifically, the patent states that the third element can be used to thermally bias the pair of sensor elements to improve their cosine law agreement when used as direction sensing devices.

OBJECTS OF THE INVENTION

The principal object of the invention is to provide a hot film dual element fluid flow measuring device having enhanced rapidity of response to changes in fluid flow.

Another object of the invention is to provide a hot film dual element fluid flow bidirectional measuring device that is capable of measuring fluid flow in directly opposite directions and that presents the same aspect to flow in either of those two directions.

A further object of the invention is to provide a hot film dual element fluid flow measuring device having increased sensitivity to small changes in fluid flow and which is particularly suitable for use in fluids containing solid particles and other types of two-phase flow.

THE DRAWINGS

DETAILED DESCRIPTION OF EMBODIMENTS OF THE INVENTION

Figure 1:
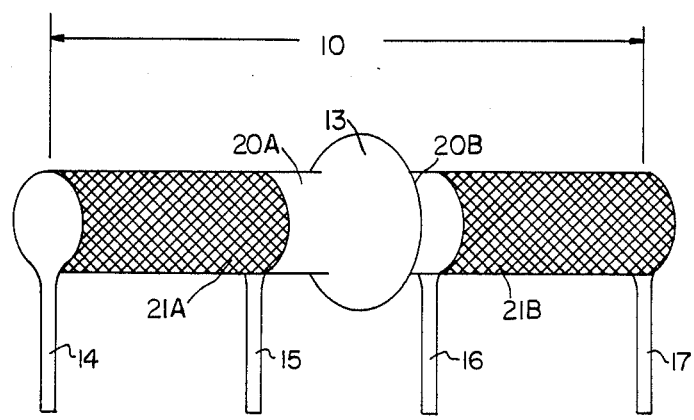
FIG. 1 is a perspective view of an embodiment of the invention having the dual sensor elements separated by the uncoated flow deflection collar and adjacent uncoated portions of the support body the preferred embodiment of the invention.

Referring now to FIG. 1 of the drawings, there is shown a thin film probe having two elongate sensor elements 21A and 21B disposed in-line on a rigid cylindrical insulative support 10. Disposed midway between the two ends of the cylindrical support is an annular collar 13. The collar 13 protrudes outwardly from the support's cylindrical body around its entire circumference.

FIG. 1 depicts an embodiment of the invention in which the collar 13 is mounted on the cylindrical support 10. The collar 13 and adjacent portions 20A and 20B of the support are uncoated. Two thermal sensors are disposed at opposite ends on the cylindrical support (21a and 21b).

In contrast to the dual element type of sensor shown in U.S. Pat. No. 3,900,819, where the heated elements are partly concealed by the thermal barrier bridging those elements, the entire circumferential surface of the invention is available for the transfer of heat directly to the surrounding fluid. Moreover, the transfer of heat to the fluid tends to be uniform around the circumference since the device, as indicated in FIG. 4, is pointed directly into the flow.

Behind the collar is a stagnant region where the flow pattern is totally unpredictable and consists of a continuously vascillating mix of eddies and currents. Beyond this stagnant region the flow pattern becomes predictable and converges on the entire circumference of the sensor. This converging, enveloping flow contains vortices that have been created by the collar. The turbulence of these vortices carries away heat at a higher rate than laminar flow; consequently, the rear sensor is cooled more than the forward sensor.

Embodiments of the invention have been constructed which are 30 to 40 mm. in length and which have a diameter of 1 or 2 mm—that is, whose ratio of length to diameter is 20 or 30 to 1. Although the ratio of length to diameter is not usually a critical parameter and may be altered as circumstances require, it is preferred to have a slender device so as to minimally interfere with the fluid's flow. The collar, in the devices that were constructed, extended 6 or 7 mm outward beyond the cylindrical body. The diameter of the collar can be chosen to suit the anticipated range of fluid flow velocities. At high velocities of fluid flow, a collar of smaller diameter may be employed to deflect the fluid stream away from the stagnant region. The direction of flow is easy to determine because the two sensors are electrically identical and it is necessary only to determine which of those sensors is the one which delivers more heat than the other to the surrounding fluid.

Figure 2:
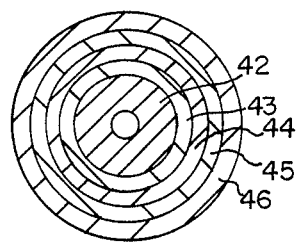
FIG. 2 is a cross-sectional view of an embodiment of the invention in which the elongate support body is a hollow cylinder.
Figure 3:
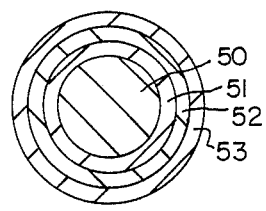
FIG. 3 is a cross-sectional view of an embodiment of the invention in which the elongate support body is a solid cylinder.
Figure 4:
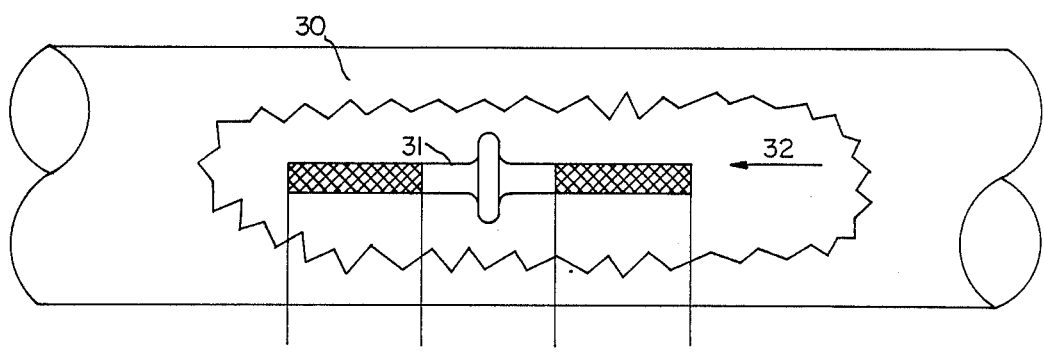
FIG. 4 depicts an embodiment of the invention disposed in a pipe which has been, in part, broken away to expose its interior.

To measure bi-directional flow in a pipe or in a channel where the fluid instantaneously reverses from the forward direction to the opposite direction, as in the air intake of an automobile engine, the fluid flow measuring device of the invention 30 is disposed in the pipe 31, as shown in FIG. 4, to extend lengthwise parallel to the fluid flow. Assuming the flow is in the forward direction as indicated by the arrow 32, the aspect of the device presents minimum obstruction to flow when the front end of the device is headed directly downstream. The fluid flow passes over a surface of the front sensor and takes away heat from the heated sensor element. The flowing fluid then is deflected outwardly by the collar. Behind that collar is a stagnant region where the fluid is in erratic motion. Depending upon the length of the rear sensor and the magnitude of the stream deflection caused by the collar, the flow does not converge until it passes over the stagnant region. The cylindrical insulative support 42, as indicated in the cross-sectional view of FIG. 2, is a hollow tube made of an electrically non-conductive refractory material such as aluminum oxide. Other electrically non-conductive refractory mateirals which have the properties of high strength, mechanical rigidity, and good temperature stability may be utilized for the support. The support 42 need not be hollow but rather can be a solid as in FIG. 3. A hollow support, however, is preferred because it reduces the mass that must be heated in the operation of the device without appreciably detracting from the support's strength and rigidity.

The sensor coat of film 45 consists of a material such as platinum or rhodium whose resistance varies markedly with temperature (i.e., a material exhibiting a large temperature coefficient of resistance). The film coat 45 is here termed the "sensor" coat to distinguish it from the underlying "heater" coat 43. The sensor coat 45, in turn, is covered by a protective coat 46 of an electrically insulative material. Preferably the protective coat 46 is very thin and ideally is constituted of a good thermal conductor so as not to appreciably impede the rapidity of response of the sensor elements of the invention. The protective coat 46 may be a layer of fused silica, aluminum oxide, teflon, or other electrically insulative material that can provide abrasion and wear protection for the underlying sensor film 45.

Underneath the sensor film 45 is a "heater" coat 43. The heater coat 43 is electrically heated for the purpose of heating the insulative support 42 so that no heat from the sensor film 45 is transferred thereto. The insulator coat 44 acts as a thermal barrier between the heater coat and the sensor coat. Consequently, whatever thermal energy is lost by the sensor coat is transferred from the sensor elements to the surrounding fluid. As previously stated the protective coat 46 is made very thin so as not to appreciably slow down that heat transfer. Because the temperature gradient between the heater coat 43 and the sensor film coat 45 is zero, or at least is minisucle compared to the temperature gradient between the sensor elements and the surrounding fluid, virtually all the heat transferred from the sensor coat 45 is conveyed to the surrounding fluid with virtually none of the heat being diverted to the support structure 42. The device functions as though the thin sensor film coat 45 had no supporting body whatever, since the only factor that affects the heat transfer to the support structure is the temperature gradient between the heater coat 43 and the support tube 42.

FIG. 3 is a cross-sectional view of an arrangement in which the ceramic tubular support is replaced by a solid heater 50. Coated upon the solid heater 50 is a coating 51 of an electrically insulative substance. Covering the electrically insulative layer is a sensor coat 52 of a film of platinum or a similar substance having a large thermal coefficient of resistance. To protect the sensor coat and electrically insulate it, a thin film 53 of a protective material is disposed over the sensor coat. In the operation of the FIG. 3 embodiment, the heater 50 is maintained close to or at the same temperature as the sensor coat 52.

Where rapidity of response is less of a consideration, the heater coat 43 and the insulator coat 44 can be omitted and the sensor coat 45 can then be placed directly on the ceramic support 42. In this modified arrangement, the response to changes in flow rate is slowed down by the heat diverted to bring the tubular support 42 into thermal equilibrium with the thin sensor coat 45. Except for the elimination of the heater coat 43 and the insulator coat 44, the device in all other respects is arranged as depicted in FIG. 1.

Where extreme rapidity of response is the overriding consideration, and provided the fluid is electrically non-conductive the protective film 46 and 53 may be omitted to eliminate any barrier to the transfer of heat from the sensor coat 45 and 52 the fluid. The heaters 43 and 50 are energized by causing an electrical current to flow through. The resistance of that coat causes some of the electrical energy to be converted to heat. The various coats disposed on the underlying support structure may be formed by vapor deposition, sputtering, silk screening, dipping, firing, sintering, or by other methods. The coating material and the nature of the substrate on which the coat is to be formed will govern the methods used. Whatever methods are used, it is important for best performance that the coating be of uniform composition and of uniform thickness.

The invention can be electrically operated in at least two different ways. In one mode of operation, the same electrical current is made to flow through the sensor coat of the two sensor elements to keep the total resistance of both elements constant. The direction of flow is then obtained by comparing the resistances of the two sensors. The resistance of the rear sensor will be affected by the flow more than the resistance of the front sensor.

In another mode of operation, different electrical currents are made to flow through the two sensors. The currents are separately regulated so that each sensor is maintained at a constant temperature. The difference in the amounts of the electrical current is then an indication of the direction of flow because the rear sensor will draw the larger current to make up for the heat transferred by it to the converging flowing fluid containing vortices whereas the front sensor will draw less current to make up for the heat transferred to the more laminar flow.

The invention can be embodied in various forms and it is not, therefore, intended that the scope of the claims be limited only to the embodiments here described. Modifications of the embodiments here desribed are obvious to those skilled in the art of thermal fluid flow probes. For example, the sensor 21a and 21b as shown in FIG. 1, may extend to the extremities of the tubular support and the electrical leads may be inserted into each end thereof.

Another example, the ends may be conical shape with the pointed end directed into the flow. Yet another example of changes that are obvious, it is evident that the support body need not be cylindrical but can be of other shapes such as oval, triangular, gradrangular, pertangular, etc. The cylindrical form of the support body is preferred because it does not have any sharp edges to disturb fluid flow, it provides the maximum outer surface are for its volume, and it is symmetrical about its longitudinal axis. Also, the diameter, and shape of the collar can be altered as desired.

In view of the many forms in which the invention can be embodied, it is intended that the scope of the invention be construed in accordance with the accompanying claims, having due regard for changes that are obvious to those skilled in the art or that merely involve the substitution of equivalents.

We claim:

1. A dual element fluid flow sensing device comprising,
    (i) an elongate support body,
    (ii) a pair of flow sensors mounted in-line at opposite ends on said elongate support body with an electrically non-conductive section mounted on said elongate support body separating the sensor pair, each flow sensor having a coat of sensor material extending around and along the elongate support body, the sensor material of the coat having a large temperature coefficient of resistance,
    (iii) means providing electrical connections to each end of each of the flow sensors whereby each flow sensor can be electrically heated by causing an electrical current to flow in the sensor coat, and
    (iv) a flow deflection collar disposed on the elongate support body and extending outwardly therefrom whereby the flow deflection collar provides a stagnant region behind the collar for one of the pair of flow sensors when the fluid flows substantially lengthwise of the elongate support body.

2. The dual element fluid flow sensing device according to claim 1, wherein
    the flow deflection collar is situated at the electrically non-conductive section of the elongate support body with one of the flow sensors extending in front of the collar and the other flow sensor extending behind the collar.

3. The dual element fluid flow sensing device according to claim, 1 further comprising
    a protective film of electrically insulative material disposed upon and covering the sensor coat of each of the flow sensor pair.

4. A dual element fluid flow sensing device comprising,
    (i) an elongate support body comprising an electrical heating element,
    (ii) a pair of flow sensors mounted in-line on the support body, each flow sensor having a coat of sensor material extending around and along the elongate support body, the sensor material of the coat having a large temperature coefficient of resistance,
    (iii) means providing electrical connections to each of the flow sensors whereby each flow sensor can be electrically heated by causing an electric current to flow in the sensor coat, and
    (iv) a flow deflection collar disposed on the elongate support body and extending outwardly therefrom whereby the flow deflection collar provides a stagnant regions behind the collar for one of the pair of flow sensors when the fluid flows substantially lengthwise of the elongate support body,
    (v) an electrically insulative layer interposed between the heating element and the coats of sensor material.

* * * * *